United States Patent

Baudequin

[11] Patent Number: 5,230,880
[45] Date of Patent: Jul. 27, 1993

[54] PROCESS AND DEVICE FOR FORMING CALCIUM OXIDE

[75] Inventor: François Baudequin, Eaubonne, France

[73] Assignee: Electricite de France, Paris, France

[21] Appl. No.: 674,954

[22] Filed: Mar. 26, 1991

[30] Foreign Application Priority Data

Mar. 27, 1990 [FR] France ........................... 90 03913

[51] Int. Cl.⁵ ............................................. C01B 13/14
[52] U.S. Cl. .................................... 423/637; 423/175; 423/177; 423/165; 423/640
[58] Field of Search ............... 423/173, 174, 175, 176, 423/177, 438, 637, 640, 165

[56] References Cited

U.S. PATENT DOCUMENTS

| | | | |
|---|---|---|---|
| 1,305,618 | 6/1919 | Pierce, Jr. | 423/637 |
| 1,334,809 | 3/1920 | Simon | 423/438 |
| 1,967,029 | 7/1934 | Karrick et al. | 423/171 |
| 2,382,909 | 8/1945 | Pierce, Jr. | 423/637 |
| 4,247,518 | 1/1981 | Charlet et al. | 423/171 |
| 4,744,963 | 5/1988 | Dozsa et al. | 423/555 |

FOREIGN PATENT DOCUMENTS

176433 4/1986 European Pat. Off.
663674 5/1979 U.S.S.R.

Primary Examiner—Gary P. Straub
Attorney, Agent, or Firm—Staas & Halsey

[57] ABSTRACT

This is a process and a device making use of a process for forming calcium oxide from pulverulent calcium carbonate, according to which an initial bath of pulverulent calcium oxide is produced in a reactor (1, 31) in the form of a fluidized bed which is heated electrically to a temperature higher than of the order of 900° C., and the said pulverulent calcium carbonate is then introduced continuously into the bath while the temperature of the bath is always kept higher than of the order of 860° C. by electrical heating, to dissociate the said calcium carbonate into calcium oxide and carbon dioxide.

5 Claims, 2 Drawing Sheets

PROCESS AND DEVICE FOR FORMING CALCIUM OXIDE

BACKGROUND OF THE INVENTION

1. Field of the Invention

The present invention relates to a process and a device for forming calcium oxide from calcium carbonate.

It finds a particularly important, though not exclusive, application in the field of the manufacture of calcium oxide of high purity, that is to say in which the percentage by weight of impurities relative to the total weight is lower than a few ppm, by electrical heating of pulverulent calcium carbonate, that is to say of a mean particle size smaller than of the order of 50 μm, obtained from limestone rock.

2. State of the Art

The production of calcium oxide by heating calcium carbonate and according to the reaction $CaCO_3 \rightarrow CaO + CO_2$ is a process which is very well known.

The chemical purity of the calcium oxide obtained depends directly, on the one hand, on the initial purity of the calcium carbonate employed and hence a priori on the mineralogical qualities of the limestone quarry from which it originates, and, on the other hand, on the calcination oven employed.

Calcination ovens which are traditionally employed are, in fact, a source of contamination because they are generally lined internally with aluminous or magnesium-containing refractory materials which remain in contact with the products during the chemical reaction. In addition, the heating is frequently produced by a combustion flame of a gas or other fuel product, generating fumes which also contaminate the calcium oxide formed.

While the processes and devices for forming calcium oxide employing calcination ovens of this type are sufficient for producing so-called commercial lime, where the impurities represent a few percent by weight, they are clearly insufficient for producing on an industrial scale pure and reactive limes where the impurities do not represent more than a few ppm.

It is an object of the invention to provide an improved process and device for forming calcium oxide. It is a more specific object to provide a process for forming very pure and very reactive calcium oxide continuously and on an industrial scale, by electrically heating calcium carbonate as a fluidised bed; this makes it possible to have little contamination both in-the case of the calcium oxide formed and of the environment, while retaining a complete control over the temperature parameters.

Electrical heating of a pulverulent material as a fluidised bed in a furnace or reactor is known. However, this heating process has not hitherto been applied to the formation of calcium oxide, especially on an industrial scale, from pulverulent calcium carbonate. In fact, between 620° C. and 750° C., pulverulent calcium carbonate exhibits a softening region where the particles tend to agglomerate together. This softening stage, sometimes called "pseudosintering stage" by some authors, which is proportionally more pronounced the smaller the particle size, does not therefore a priori allow a fluidised bed of pulverulent calcium carbonate to be heated to a sufficient temperature for the dissociation to calcium oxide to take place.

The invention allows this disadvantage to be overcome.

To this end there is provided a process for forming calcium oxide from pulverulent calcium carbonate, comprising the steps of:

preparing an initial bath of pulverulent calcium oxide within a reactor, said initial bath being in the form of a fluidised bed heated electrically to a temperature higher than of the order of 900° C., and continuously introducing the pulverulent calcium carbonate into said initial bath, which forms a dissociating bath, while maintaining the temperature of said dissociating bath at a temperature higher than of the order of 860° C. by electrical heating, whereby said calcium carbonate is dissociated into calcium oxide and carbon dioxide, within said dissociating bath.

Generally, in order to keep the volume of the bath forming the fluidised bed substantially constant, a continuous extraction of calcium oxide from the reactor, for instance at an opposite side from the introduction of calcium carbonate, is simultaneously provided. This allows a continuous process for forming calcium oxide.

The invention has parts of its origin in the following observations:

The softening stage does not exist in the case of pulverulent calcium oxide, which can therefore be heated as a fluidised bed to 900° C.

It was furthermore found experimentally that the continuous introduction of "cold" pulverulent calcium carbonate, while heating to keep the temperature at all parts of the bath above the threshold temperature for decarbonation, made it possible to dispense with the risks of agglomeration of the particles of pulverulent calcium carbonate preventing fluidisation from continuing.

An other object of the invention is to provide a process wherein the initial bath of pulverulent calcium oxide is in the form of a fluidised bed obtained gradually from calcium carbonate or limestone whose particle size is reduced in stages. It has been observed by the inventors that the softening stage of calcium carbonate is a function of the particle size of the heated powder and that it almost disappears completely in the case of a particle size larger than 300 μm.

In such an embodiment as described above, a first bath in the form of a fluidised bed consisting of limestone of mean particle diameter greater than 300 μm, for example of approximately 350 μm, is heated to a temperature above approximately 900° C. and then, while the temperature of the fluidised bed is maintained above 900° C., limestone of a mean particle diameter of between 150 and 80 μm is introduced gradually while the fluidisation flow rates are adjusted to obtain a bed of quicklime of the same particle size and, finally, pulverulent calcium carbonate, for example of mean particle diameter smaller than of the order of 40 μm is introduced gradually until the said initial bath of calcium oxide is obtained in the form of a fluidised bed at a temperature higher than of the order of 900° C.

It is another object of the invention to provide a process wherein the calcium carbonate is obtained by calcining a precrushed limestone rock, separating the calcinate and the carbon dioxide from dissociation, hydrating the calcinate to remove impurities, and recombining the calcinate with recovered carbon dioxide from dissocation to form pulverulent calcium carbonate in precipitated form.

Since the calcium carbonate thus obtained is particularly pure, the quality of the calcium oxide produced by thermal dissociation of such a carbonate is further improved thereby.

In addition, in other advantageous embodiments, either or both of the following arrangements are resorted to:

the bath in the form of a fluidised bed is heated by a network of electrical Joule effect heating elements which are distributed and arranged directly within the fluidisation bath, air is employed as fluidising gas.

It is a further object of the invention to provide a device for making use of the process according to the invention, characterised in that it comprises a reactor having a vessel defining a fluidisation chamber whose inner walls are metal sheets made of or covered with refractory metals or metal alloys.

An other object of the invention is to provide a Device for forming calcium oxide from pulverulent calcium carbonate comprising:

a reactor having a vessel defining a fluidisation chamber whose inner walls are metal sheets made of or covered with refractory metals or metal alloys, means for fluidising pulverulent calcium oxide and pulverulent calcium carbonate within said chamber, in the form of a fluidised bed, means for heating electrically to a temperature higher than of the order of 900° C. said fluidised bed, means for continuously introducing the pulverulent calcium carbonate into said fluidised bed, while maintaining the temperature of said fluidised bed at a temperature higher than of the order of 860° C. by electrical heating, whereby said calcium carbonate is dissociated into calcium oxide and carbon dioxide, within said fluidised bed, and:

means for continuously extracting the pulverulent calcium oxide from said reactor.

In an advantageous embodiment the reactor is provided with means for feeding calcium carbonate into the lower part of the fluidised bed and with means for removing calcium oxide in the upper part of the fluidised bed.

The invention will be understood better on reading the particular embodiments which are given by way of examples, no limitation being implied.

SHORT DESCRIPTION OF THE DRAWINGS

The description refers to the drawings which accompany it, in which.

DETAILED DESCRIPTION

Figure 1:
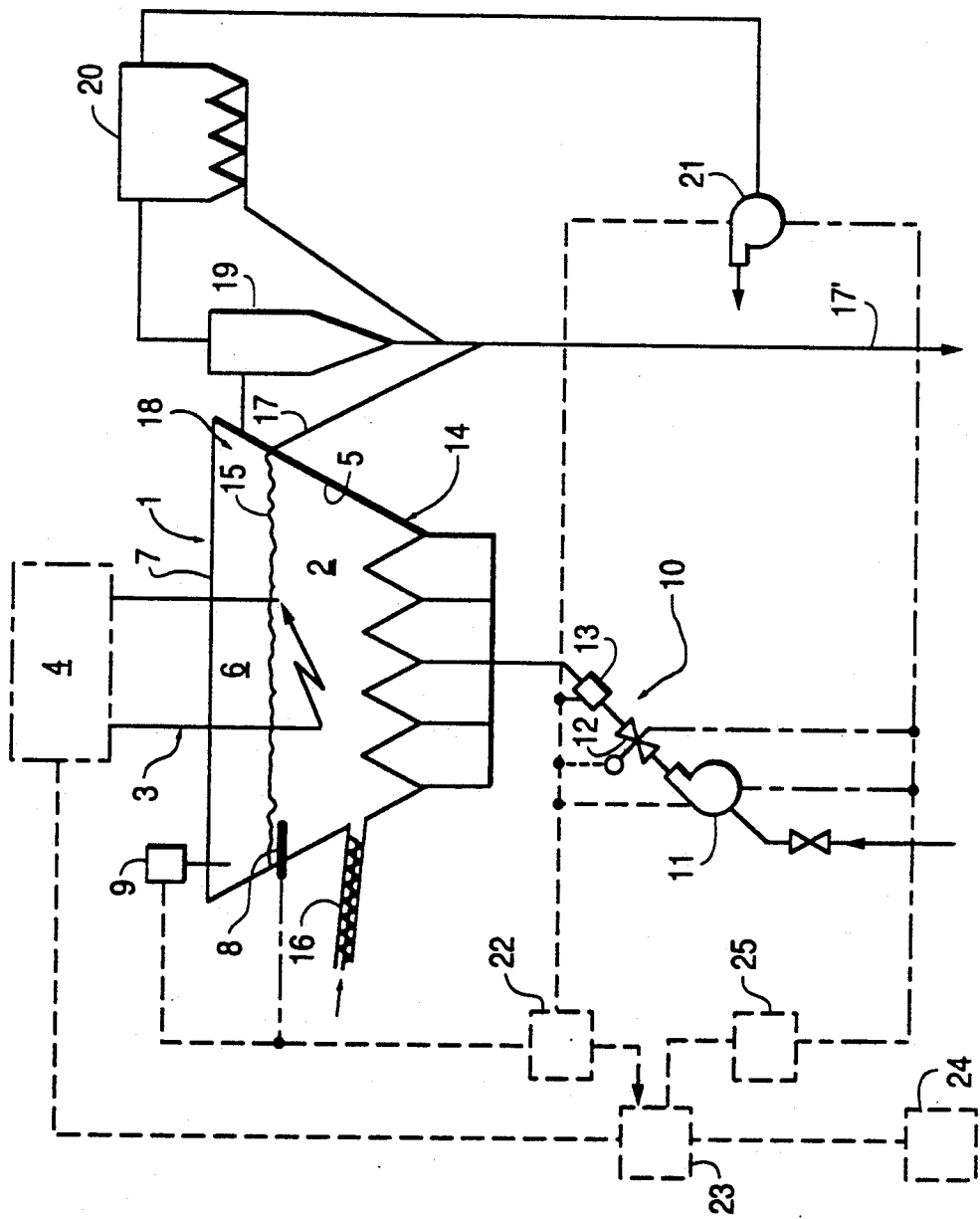
FIG. 1 is a basic scheme for forming carbon oxide according to the embodiment of the invention described more particularly here, by direct heating within the fluidised bed.

FIG. 1 shows diagrammatically a device according to the embodiment of the invention, more particularly described here, comprising a reactor 1 for calcining pulverulent calcium carbonate, containing a fluidised bed heated directly within it by a Joule effect system 3 supplied with electricity by an electrical source 4.

The internal walls 5 of the reactor in contact with the fluidised bed bath are preferably made of a refractory metal alloy or are covered with a refractory metal layer.

The system 3 may, for example, consist of a net-work of Joule effect heating elements of the type described in Patent Application FR-A-2,600,855. The reactor comprises a closed vessel 6 provided with a lid 7. Temperature sensors 8 arranged in the fluidisation bath and pressure sensors 9 for the vessel 6 are provided.

The reactor is fed with fluidising gas, for example air, from the bottom via a circuit 10 which is known per se, comprising a booster blower 11 with, for example, a speed controller, a remotely controlled valve 12 and a flowmeter 13 for measuring the gas flow rate. While not being limited in this respect, the reactor advantageously has a cross-section which increases from the bottom 14 towards the free surface 15 so as to maintain the fluidising velocities below the entrainment velocities of the calcium carbonate introduced and of the calcium oxide formed in the form of a fluidised bed.

Pulverulent calcium carbonate with a particle size of between 5 and 50 μm, for example between 10 and 40 μm, is fed continuously at the bottom of the reactor, for example via a feed chute 16 discharging into an opening made in the side wall of the oven.

Once formed, calcium oxide flows out by means of an overflow spillway 17 towards the outlet 17' connected to a packing plant.

The fluidising gas and the carbon dioxide formed during the dissociation of the calcium carbonate are discharged in the upper part 18 towards a gas treatment circuit. The latter comprises, for example, a separating cyclone 19 where the pulverulent calcium oxide still suspended is trapped and flows under gravity towards the outlet 17', a dust removal filter 20, for example of the sleeve filter type, and a booster blower 21, for example one fitted with a speed variator.

FIG. 1 also shows, diagrammatically and using broken lines, the monitoring and control connections between the various units of the plant. These units are connected to one or more input/output cabinets 22 for monitoring and controlling an automatic unit 23 connected to a control and display panel 24.

Control of the booster blowers 11 and 21 and of the remotely controlled valve 12, which are supplied with electrical and/or pneumatic power in a manner which is known per se, (in dot-dash lines in FIG. 1) is performed via an inputs/outputs cabinet 25 controlling the actuators.

The electrical power supplied by the source 4 is, furthermore, also advantageously controlled by the automatic unit 23.

Figure 2:
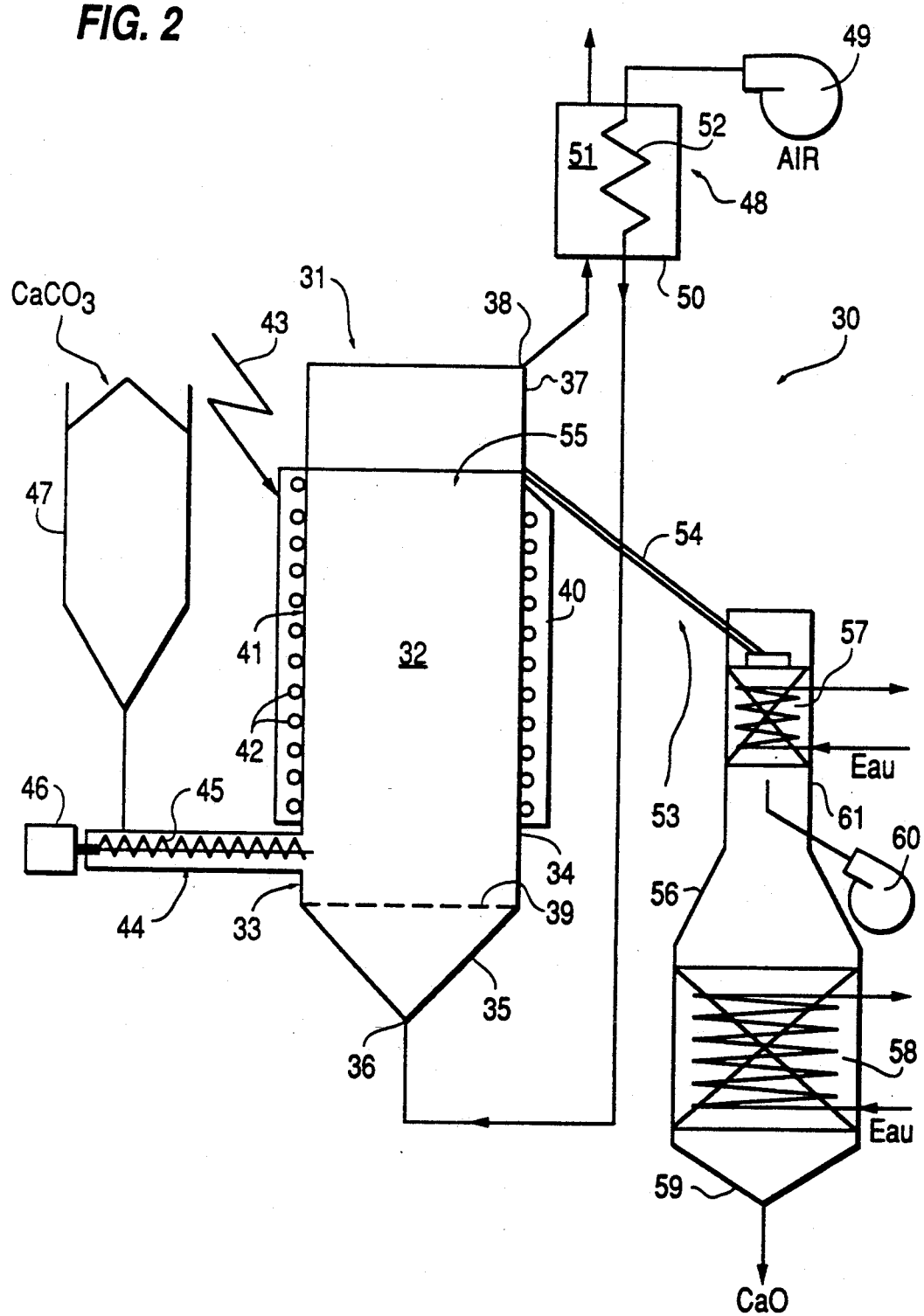
FIG. 2 is a basic scheme for another embodiment of the invention, using external heating of the fluidised bed.

FIG. 2 shows another embodiment of a device 30 according to the invention, comprising a reactor 31 for calcining calcium carbonate, containing a fluidised bed 32. The reactor comprises a vertical vessel 33 which is cylindrical in its major part 34. The vessel has a conical lower end part 35 pierced at the apex 36 of the cone with a feed opening for fluidising hot air, and an upper end part 37 provided with an outlet 38 for discharging gases in the top part.

A grid 39 for distributing the hot air and for at least partially optionally retaining the particles of the fluidised bed, separates, for example, the part 34 from the part 35.

The part 34 comprises an external shell 40 for conductive heating, applied flat against the outer wall 41 of the said part, and consisting, for example, of heating resistors, shown diagrammatically as 42 in FIG. 2. The electrical power supply 43 is provided by a circuit which is known per se (not shown).

Calcium carbonate of small particle size is introduced into the bottom part of the vessel, above the lower end part 35 and the grid 39, by feeding means 44 consisting, for example, of a metering screw 45 driven by an electrical motor 46. The screw is fed with $CaCO_3$ under gravity via a buffer storage vessel 47.

A feed circuit 48 for fluidising hot air is provided. It comprises, for example and in a known manner, a fan 49 and a tubular exchanger/heater 50.

Air and the gases produced by the calcination are used to heat the fluidising hot air circulating through the calandria 51 countercurrent-wise to the fluidising air, which flows in the tubing 52 of the exchanger. This device permits considerable energy savings to be made.

The device also comprises a circuit 53 for discharging the CaO formed. This circuit comprises a sloping chute 54 for discharge by gravity.

This chute, on the one hand, opens into the vessel 34 above the heating shell at the top part 55 of the fluidised bed which overflows therein via a spillway. On the other hand, it is connected to a cooling column 56 provided with a first exchanger 57 comprising coils fed with cooling water, for example with a water entry temperature of 20° C., and with a second exchanger 58, cooled by coils which are, for example, also fed with water.

The first exchanger 57 may advantageously be an exchanger of the triple flow type, in which case a low flow rate air fan 60 is provided for feeding via the bottom the part of column 61 provided with the first exchanger 57. This countercurrent-wise air stream permits, on the one hand, the cooling of the CaO scattered at the delivery of the chute at the top of column 56 and, on the other hand, the slowing down in the speed of the fall of the calcium oxide originating from the chute 54 through the coils of the exchanger 57.

The cooled CaO is discharged in the lower part 59 of the column, to be stored or processed.

Means for control and monitoring, which are known per se, of the various units of the device 30 are also provided; they permit the device to operate, for example automatically. They have not been shown in FIG. 2.

By way of example, no limitation being implied, a device 30 of this type can calcine 100 kg/h of $CaCO_3$, requiring an electrical power of the order of 140 kW. A fluidising air flow rate of 140 Nm3/h is then injected into the lower part 35 of the reactor at approximately 500° C., generating at the outlet 38 a flow rate of 140 to 150 Nm3/h of air and of smoke, whose temperature can be reduced to of the order of 120° C. after cooling using the exchanger 50.

The temperature of the CaO formed is, for example, of the order of 150° C. after passing through the first exchanger 57, the flow rate of the fan 60 being, for example, of the order of 10 Nm3/h.

The operation of the plant which is used is now described more precisely below with reference to FIG. 1.

To begin with, an initial bath of calcium oxide as a fluidised bed heated to of the order of 900° C. is produced in the reactor 1.

To start up the fluidised bed reactor for the first time, therefore, an initial charge of calcium oxide must be available. During subsequent start-ups it would be sufficient, in fact, to employ a charge of calcium oxide produced during a preceding working campaign.

Two routes are essentially provided for the first start-up:

a charge of calcium oxide produced in another oven, for example a rotary oven of the traditional type, is employed, or else the procedure is as follows:

An initial heating to a temperature of the order of 900° C. is carried out with a charge of limestone of relatively large mean particle diameter, for example 350 $\mu$m, which makes it possible to avoid the agglomeration phenomenon observed with pulverulent limestone (particle size smaller than of the order of 50 $\mu$m) in the temperature range from 600° to 750° C. The heating is performed gradually from room temperature up to 900° C., for example automatically with control by the automatic unit 23. What is needed is that the final temperature of the bath should be higher than the threshold temperature for dissociation, bearing in mind the pressure in the vessel 6. This temperature is then maintained to convert the bath of calcium carbonate in the form of a fluidised bed into a bath of fluidised quicklime. A charge of ground limestone of finer particle size, for example of mean particle diameter of the order of 100 $\mu$m is then introduced gradually via the feed chute 16. The fluidising flow rates are simultaneously adjusted, for example, automatically via the speed variator of the booster blower 11. The temperature is also controlled automatically via the sensors 8 and is maintained throughout the fluidised bed unit at of the order of 900° C. during the introduction.

Finally, once the bed of quicklime of 100 $\mu$m particle size is formed, calcium carbonate whose particle size is between 10 and 40 $\mu$m is introduced gradually until the initial calcium oxide bath is obtained.

Pulverulent calcium carbonate is then introduced continuously into the reactor via the feed chute 16 to form the pure calcium oxide according to the invention. The calcium carbonate enters the initial bath of pulverulent calcium oxide in the form of a fluidised bed whose temperature is uniform, with which it mixes. The fluidisation is produced by means of the fluidising gas, for example, air, injected via the bottom 14 of the reactor. The fluidisation flow rate is controlled automatically in a manner which is known per se.

The bath is heated directly by the system 3 which is supplied with electricity so a to maintain the whole bath at a temperature which is higher than or equal to of the order of 860° C. as a function of the flow rate at which the pulverulent calcium carbonate is introduced. As the dissociation takes place, the carbon oxide formed is extracted via the vacuum pump/booster blower 21.

In step with the dissociation, calcium oxide is formed from the calcium carbonate and is discharged by extracting or discharging means, here by overflowing.

The carbon oxide and the fluidising gas which have passed through the bath 2 ar extracted still carrying a little pulverulent calcium oxide. The extract gases are therefore freed from dust in 18 and are filtered in 20 before flowing through the vacuum pump 21.

The capacity of a reactor operating with the process of the invention is, for example, advantageously of the order of 50 to 300 kg/h. However, larger capacities can be envisaged.

As is obvious, the invention is not limited to the embodiments described more particularly here. It covers all the alternative forms and especially those where the initial calcium oxide bath is obtained from a number of charges of calcium carbonate of gradually changing particle sizes of between 400 μm and a value of less than 50 μm.

I claim:

1. Process for forming calcium oxide from pulverulent calcium carbonate, comprising the steps of:
   preparing an initial fluidised bath of pulverulent calcium oxide within a reactor, according to the following steps:
   heating a first fluidised bath of limestone of average particle diameter greater than of the order of 300 μm to a temperature above approximately 900° C., and then maintaining the temperature above 900° C. and below the temperature of obtention of dead burned product,
   introducing gradually limestone of a mean particle diameter of between 150 and 80 μm while the fluidisation flow rates are adjusted until a second fluidised bath of quicklime of the same particle size is obtained, and
   finally, introducing gradually calcium carbonate of mean particle diameter smaller than of the order of 40 μm until obtaining the initial fluidized bath of calcium oxide at a temperature higher than of the order of 900° C., and below the temperature of obtention of dead burned product; and
   continuously introducing the pulverulent calcium carbonate having a mean particle size smaller than 50 μm, into said initial fluidized bath, which forms a dissociating bath, while maintaining the temperature of said dissociating bath at a temperature higher than of the order of 860° C. by electrical heating and below the temperature of obtention of dead burned product, whereby said calcium carbonate is dissociated into calcium oxide and carbon dioxide, within said dissociating bath.

2. Process according to claim 1, wherein the calcium carbonate employed is obtained by calcining a pre-crushed limestone rock, separating the calcinate and the carbon dioxide from dissociation, hydrating the calcinate to remove the impurities and recombining the calcinate with recovered carbon dioxide from dissociation to form pulverulent calcium carbonate in recipitated form.

3. Process according to claim 1, wherein air is employed as fluidising gas.

4. Process according to claim 1, wherein said electrical heating is performed by a network of electrical Joule effect heating elements which are distributed and arranged directly within said fluidised bath.

5. Process according to claim 1, wherein said electrical heating is performed by external heating.

* * * * *